(12) United States Patent
Guo et al.

(10) Patent No.: US 12,083,691 B2
(45) Date of Patent: Sep. 10, 2024

(54) SWING BRIDGE AND ELECTRICALLY DRIVEN DEVICE HEREWITH

(71) Applicant: Braun GmbH, Kronberg (DE)

(72) Inventors: Tiandong Guo, Beijing (CN); Xinwu Lai, Singapore (CN); Kejin Li, Beijing (CN); Detlef Gleich, Friedrichsdorf (DE); Uwe Fischer, Darmstadt (DE); Bernd Stassen, Idstein (DE)

(73) Assignee: Braun GmbH, Kronberg (DE)

( * ) Notice: Subject to any disclaimer, the term of this patent is extended or adjusted under 35 U.S.C. 154(b) by 0 days.

(21) Appl. No.: 17/361,580

(22) Filed: Jun. 29, 2021

(65) Prior Publication Data
US 2022/0001554 A1 Jan. 6, 2022
US 2024/0001571 A9 Jan. 4, 2024

(30) Foreign Application Priority Data

Jul. 1, 2020 (WO) ................ PCT/CN2020/099803

(51) Int. Cl.
*B26B 19/28* (2006.01)
*B26B 19/04* (2006.01)

(52) U.S. Cl.
CPC ............ *B26B 19/28* (2013.01); *B26B 19/046* (2013.01)

(58) Field of Classification Search
CPC .......... B26B 19/28; B26B 19/00; B26B 19/12
See application file for complete search history.

(56) References Cited

U.S. PATENT DOCUMENTS

| | | | |
|---|---|---|---|
| 3,538,604 A | * | 11/1970 | Spencer ................ B26B 19/382 |
| | | | 310/47 |
| 3,714,711 A | | 2/1973 | Daniels |
| 4,428,117 A | | 1/1984 | Horii et al. |
| 4,649,762 A | | 3/1987 | Messinger et al. |
| 4,669,322 A | | 6/1987 | Messinger et al. |
| 5,050,300 A | * | 9/1991 | Miska ................. B26B 19/3866 |
| | | | 30/34.1 |
| 5,193,275 A | * | 3/1993 | Hirokazu ................ B26B 19/28 |
| | | | 30/43 |
| 5,207,731 A | | 5/1993 | Bukoschek |
| 5,678,312 A | | 10/1997 | Watanabe |

(Continued)

FOREIGN PATENT DOCUMENTS

| | | | |
|---|---|---|---|
| AT | 390393 B | 4/1990 | |
| CA | 2817398 A1 * | 10/2012 | ........... B26B 21/225 |

(Continued)

OTHER PUBLICATIONS

All Office Actions; U.S. Appl. No. 17/361,550, filed Jun. 29, 2021.

(Continued)

*Primary Examiner* — Jennifer S Matthews (57) ABSTRACT

The invention relates to a swing bridge for converting a rotary motion into an oscillating motion, especially into a linear oscillating motion, especially within an electrically driven device. The swing bridge comprises an oscillating body defining a plane. The oscillating body comprises a slot arranged in the plane, wherein a first axis extends through the slot perpendicular to the plane, and a drive shaft protruding perpendicular to the plane along a second axis.

17 Claims, 6 Drawing Sheets

Section A - A (56) References Cited

U.S. PATENT DOCUMENTS

| | | | |
|---|---|---|---|
| 5,679,991 A * | 10/1997 | Wolf | B26B 19/28 310/80 |
| 5,771,580 A | 6/1998 | Tezuka | |
| 5,771,880 A | 6/1998 | Tsai | |
| 6,430,813 B2 | 8/2002 | Muraguchi et al. | |
| 6,568,083 B1 * | 5/2003 | Taniguchi | B26B 19/10 30/43.2 |
| 2005/0172492 A1 | 8/2005 | Blaustein et al. | |
| 2011/0099814 A1 | 5/2011 | Fuerst et al. | |
| 2011/0099816 A1 | 5/2011 | Carlucci | |
| 2011/0289777 A1 | 12/2011 | Quan et al. | |
| 2018/0085947 A1* | 3/2018 | Fischer | B26B 19/12 |
| 2020/0078151 A1 | 3/2020 | Plotka | |
| 2022/0001555 A1 | 1/2022 | Guo et al. | |

FOREIGN PATENT DOCUMENTS

| | | | |
|---|---|---|---|
| CN | 1525720 A | 9/2004 | |
| CN | 201109129 Y | 9/2008 | |
| CN | 101448611 A | 6/2009 | |
| CN | 202637169 U | 1/2013 | |
| CN | 203331055 U | 12/2013 | |
| CN | 206733070 U | 12/2017 | |
| CN | 110039577 A | 7/2019 | |
| CN | 110176809 A | 8/2019 | |
| DE | 3912090 C1 * | 8/1990 | |
| EP | 0151971 A2 * | 8/1985 | |
| EP | 1162721 A2 * | 12/2001 | B26B 19/282 |
| EP | 3025833 A1 | 6/2016 | |
| JP | S5456565 A | 5/1979 | |
| JP | S05754354 U | 3/1982 | |
| JP | S61220687 A | 9/1986 | |
| JP | S062130574 U | 8/1987 | |
| JP | S62201180 A | 9/1987 | |
| JP | S6250561 U | 5/1991 | |
| JP | H0615872 A | 1/1994 | |
| JP | H07185151 A | 7/1995 | |
| JP | H1015259 A | 1/1998 | |
| JP | H10156067 A | 6/1998 | |
| JP | H10211370 A | 8/1998 | |
| JP | 2001009176 A | 1/2001 | |
| JP | 4348836 B2 | 10/2009 | |
| KR | 20080005826 U * | 12/2008 | |
| KR | 20180031699 A * | 3/2018 | |
| WO | WO-2007131579 A1 * | 11/2007 | B26B 19/28 |
| WO | 2012124459 A1 | 9/2012 | |

OTHER PUBLICATIONS

PCT Search Report and Written Opinion for PCT/CN2020/099803 dated Mar. 31, 2021, 8 pages.

PCT Suppl. Search Report and Written Opinion for PCT/CN2020/099803 dated Sep. 23, 2022, 07 pages.

* cited by examiner

SWING BRIDGE AND ELECTRICALLY DRIVEN DEVICE HEREWITH

FIELD OF THE INVENTION

The present invention is concerned with a swing bridge for converting a rotary motion into an oscillating motion, especially into a linear oscillating motion, for an electrically driven device, for example an electric hair removal device, such as a wet or dry shaver. The swing bridge may further find application in an electric toothbrush or an electric skin treatment device.

BACKGROUND OF THE INVENTION

EP 2 024 147 B1 discloses a swing bridge for converting a rotary motion into an oscillating motion. This known swing bridge can be used in an electrically driven device such as a dry shaver. The swing bridge comprises an oscillating body with a coupling, a drive shaft and two swing arms. The coupling comprises a slot for coupling an eccentrically rotatable drive pin coupled to a drive shaft of an electric motor to the swing bridge. Further, the drive shaft of the oscillating body may be coupled to a cutter unit, wherein the two drive shafts, i.e. the drive shaft of the electric motor and the drive shaft of the oscillating body, are arranged in a common plane running through the slot. The swing arms can be coupled to a housing of an electrically driven device. Thus, during use of an electrically driven device, the oscillating body of the swing bridge is only free to move in a linear direction between the two swing arms. The swing bridge, therefore, converts a rotary motion of a drive pin into a linear oscillating motion of the drive shaft.

The alignment of the drive shafts in a common plane may have drawbacks regarding the assembly of an electrically driven device, as the drive shaft of the electric motor has to be arranged in line with the drive shaft of the swing bridge. In addition, the swing arms of the swing bridge are complicated to form and need plenty of space in a longitudinal direction. Further, an additional coupling comprising a slot is needed in order to couple the swing bridge to an electric motor.

SUMMARY OF THE INVENTION

It is an object of the present disclosure to provide a swing bridge and an electrically driven device comprising the swing bridge for converting a rotary motion into an oscillating motion, especially into a linear oscillating motion of a cutter unit, improving the required space within an electrically driven device as well as the way of assembling the swing bridge to an electric motor and a cutter unit.

This object is solved by a swing bridge for converting a rotary motion into an oscillating motion, especially into a linear oscillating motion as defined in claim 1 and by an electrically driven defined in claim 9.

The swing bridge comprises an oscillating body defining a plane, wherein the oscillating body comprises a slot arranged in the plane, and wherein a first axis extends through the slot perpendicular to the plane. The feature of the "swing bridge" may also be named "oscillation bridge" hereinbelow. Further, the oscillating body comprises a drive shaft protruding perpendicular to the plane along a second axis, and at least one web extending at least substantially perpendicular to the plane. The web or wing has a free end facing away from the oscillating body for securing the oscillating body to permit movement of the oscillating body substantially only parallel to the plane, i.e. in one direction. The first axis that extends through the slot perpendicular to the plane and the second axis are offset at least in one direction of the plane.

DETAILED DESCRIPTION OF THE INVENTION

Preferably, the plane defined by the oscillating body comprises a greater length in its longitudinal direction, i.e. the swing direction, than in its transverse direction. The first axis, which extends through the slot perpendicular to the plane, preferably extends through the center of the slot. Preferably, the axes are offset at least in said longitudinal direction. Further, it is preferred, when the second axis is arranged in an edge area of the plane. The axes may also be offset in said transverse direction or, preferably, in a combined longitudinal and transverse direction. Independent of the direction of the offset, the offset between the two axes allows to arrange the drive shaft of an electric motor offset to the drive shaft of the oscillating body and thus an offset power transmission. The slot may be an elongated hole or a groove. Preferably, the elongated hole or groove has its smaller widening in the longitudinal direction of the swing bridge. Preferably, the swing bridge comprises at least one web equally arranged on each side in longitudinal direction of the slot. The web may also refer to the term swing arm, so that the terms swing arm and web may be used synonymously. Preferably, the webs or swing arms are arranged at the lateral ends of the oscillating body in longitudinal direction. Still, there may be embodiments of the invention, wherein it is preferred that the at least one web is arranged between the slot and the lateral ends in the longitudinal direction of the oscillating body. Further, the webs of the oscillating body each comprise a free end facing away from the oscillating body. Preferably, the width of the webs in the transverse direction is equal to the width of the oscillating body in the transverse direction. However, the width of the webs may also be smaller and/or may also differ or alternate between the oscillating body and their free end. Moreover, the webs comprise preferably a plate-type shape, wherein the free ends of the webs can be used to secure the oscillating body. Therefore, the webs may comprise attachment means at their free ends. Each attachment means may have the form of a protrusion or bead facing away from the oscillating body. Preferably, the width of the webs in the transverse direction is greater than the material strength of the webs in the longitudinal direction. The term "material strength" here and on all following pages refers to all features which impact the stiffness of the web, e.g. "material strength" can replaced by the term "material thickness" or other measure to change the stiffness. Consequently, the webs are flexible and thus easily bendable when the oscillating body is moved in its longitudinal direction and the free ends of the webs are secured. However, the webs are stiff when a force acts on the oscillating body in its transverse direction. In addition, it may be preferred, that the webs comprise a different material strength at the end portion to improve the securing. In some embodiments, it may also be preferred, that the oscillating body comprises only at least one web between the slot and the ending of the oscillating body in the longitudinal direction on one side. In the case, wherein only one side comprises at least one web, the opposite side may be arranged within a guiding. The guiding may comprise elastic means in order to provide a force according to the force a web provides, when the oscillating body is shifted and the webs are bent. It is even possible, that the oscillating body does not comprise a web at all and comprises a guiding on either side.

In one embodiment, the slot may be located substantially centrally on the oscillating body. If the swing bridge comprises more than one web equally arranged on each side in the longitudinal direction of the slot, a centered arrangement of the slot on the oscillating body ensures an even load acting on the webs, when the webs are secured and the swing bridge oscillates within an electrically driven device. Therefore, a centered location of the slot on the oscillating body can be understood as centered between the webs in the longitudinal direction and preferably also centered between the edges of the oscillating body in the transverse direction. The slot may be a cut through the oscillating body, i.e. a through hole, or may be a recess, like a groove.

Further, in one embodiment of the swing bridge, the first axis and the second axis may be offset to each other in two directions of the plane. Preferably, the first axis protrudes perpendicular to the plane and through the center of the slot, wherein the second axis is offset in a longitudinal and a transverse direction of the plane. Hence, the second axis may be located in a corner section of the oscillating body. When the swing bridge is used within an electrically driven device, the second axis is preferably arranged in the center of the device. Therefore, the offset of the two axes allows to arrange an electric motor offset to the center of the swing bridge and thus, offset to the center of the electrically driven device.

One embodiment of the swing bridge may comprise the oscillating body with at least two components arranged on top of one another, wherein each of the components comprises a plate-type section, and wherein the plate-type sections are for example connected in an integrally bonded manner, preferably by ultrasonic welding, or by a form fit. If ultrasonic welding connects the components, preferably at least one of the components comprises welding dots, wherein the other component may comprise respective holes. Further, it is preferred, when the upper component comprises the drive shaft and the lower component comprises the at least one web. Consequently, it may be preferred when the upper component comprises a stiffer material and the lower component comprises a more flexible material. Nevertheless, as an alternative, it may be preferred when the two components are formed as one. Regardless of the number of components, preferably the components of the oscillating body are injection molded. As mentioned before, the slot may be a cut through or may be recess. Due to the fact that the at least two components are arranged on top of each other, it may be advantageous if the slot only cuts through the lower component, i.e. the component closer to the drive pin. Additionally or as an alternative, it may be advantageous if the slot also forms a cut through and/or a recess within the components arranged on top of the lower component. Furthermore, the shape of the at least two components may differ. Therefore, one component may protrude beyond another component at least in the longitudinal direction on at least one side, preferably in the longitudinal direction. The above-mentioned features also account for an oscillating body with only one component.

In addition, the at least one web may be an integral part of one of the at least two components. As mentioned before, it is preferred when the at least one web comprises a greater width in the transverse direction than the material strength of the webs in the longitudinal direction. Preferably, the at least one web comprises at least partially the same size in transverse direction as the oscillating body and/or the swing bridge. The production is considerably simplified if the at least one web is an integral part of one the at least two components. However, it may also be preferred when the webs of the oscillating body are connected to the oscillating body by common connecting means and methods.

In one embodiment, the two components may comprise a plastic material, wherein the plastic material is preferably a type of polyoxymethylene. For the use of ultrasonic welding, the upper and lower component should comprise the same type of plastic material, but they may differ in material properties, like strength, hardness, etc. Furthermore, a high mechanical strength as well as a good flowability are required if thin plastic walls such as webs are formed by injection molding. To achieve a high dimensional accuracy it is further advantageous when the material used for injection molding comprises a relatively low shrinkage rate. Thus, according to one example, the upper component is formed by POM HOSTAFORM C9021 GV3/30 and the lower component is formed by POM ULTRAFORM H2320 004. Other materials, especially materials comprising the required characteristics, may be used as an alternative.

In an additional or an alternative embodiment, one of the at least two components and the drive shaft may be form-fitted, wherein the drive shaft is preferably overmolded. It may also be preferred if the drive shaft is screwed or connected to at least one of the two components by other common connecting means. Regardless of the type of connection, it may be preferred, if the connection of the drive shaft comprises ribs, wherein the ribs are supported on the oscillating body. Overmolding of the drive shaft offers the advantage of an inexpensive and a comparatively simple production of the swing bridge. In addition, overmolding allows to connect two materials, i.e. the material of the at least one component and the material of the drive shaft, which may otherwise be difficult to join.

In one embodiment, the drive shaft may comprise a metal material. The use of a metallic material has the advantage that the drive shaft wears out less quickly and thus has a higher durability. Since a damage of the drive shaft also causes the function of the swing bridge to fail, a long durability of the drive shaft is desired. This is especially the case, if the drive shaft is non-detachable connected to the swing bridge and therefore, cannot be replaced. It may also be preferred, if the drive shaft is an integral part of at least one of the two components of the oscillating body, wherein the drive shaft may be injection molded together with at least one of the two components, and wherein the drive shaft comprises an additional metal coating.

Both, the choice of material for each individual component of the swing bridge as well as the method of manufacture, should be chosen in accordance with the use of the swing bridge and in particular in accordance with the loads acting its individual components.

The swing bridge may be used within an electrically driven device to convert a rotary motion into an oscillating motion, especially into a linear oscillating motion. According to claim 9, such an electrically driven device may comprise a housing with a chassis, an electric motor mounted in the chassis and comprising an eccentrically rotatable drive pin, and the swing bridge according to one of the before mentioned embodiments. The swing bridge is adapted to be mechanically coupled to the drive pin, and the drive pin extends into the slot of the swing bridge. Thus, the eccentrically rotary motion of the first pin is converted into a linear oscillating motion of the drive shaft by means of the swing bridge.

The housing may be formed by multiple components, which may be interconnected by common attachment means such as screws, hooks, glue, welding or the like. The same accounts for the chassis. In addition, the housing or some components of the housing and the chassis may be formed as one. The eccentrically rotatable drive pin may be an integral part of the drive shaft but may also be attachable to the drive shaft of the electric motor. Preferably, the eccentrically rotatable drive pin of the electric motor extends into the slot of the swing bridge. Consequently, when the slot comprises an elongated hole with its smaller widening in the longitudinal direction of the swing bridge, a rotation of the drive pin causes an at least substantially linear motion of the swing bridge in its longitudinal direction, when the swing bridge is secured by its webs to the housing and/or chassis. The conversion of a rotatable motion into a linear motion allows to use rotatable electric motors that are well-known, inexpensive and that comprise a high durability. Preferably, the electrically driven device further comprises a button in order to activate the device. The electrically driven device may be driven by at least one battery unit, wherein the battery unit is preferably rechargeable, and/or by a power connection to an electric socket. Additionally, the offset of the first axis and the second axis, i.e. the offset of the slot and the drive shaft, permit an asymmetric assembly of an electrically driven device, wherein a drive shaft of the electric motor does not need to be in line with the drive shaft of the swing bridge.

In one embodiment, the second axis may form a central axis of the housing and/or the chassis. Therefore, the drive shaft is arranged along the central axis of the housing and/or the chassis.

According to the offset between the first and the second axis, the electric motor is consequently offset to the center of the housing and/or the chassis. Preferably, the electric motor is arranged on one side of the housing and/or the chassis. Further, at least one battery unit may be arranged on the opposite side of the housing and/or the chassis. The centered arrangement of the drive shaft allows to convert a rotational motion of an electric motor offset to the center of the housing and/or the chassis into a linear oscillating motion around the central axis of the housing and/or the chassis. Hence, a unit, such as a cutter unit, attached to the drive shaft may also be centrically driven.

Preferably, the at least one web may be interconnected to the housing and/or the chassis, preferably by hot-staking. The at least one web may also be interconnected to the housing and/or the chassis by other common connecting means such as by plug or clipped connection, by welding or the like. Due to the interconnection, the free end facing away from the oscillating body is fixed, wherein at least the oscillating body is free to move in its longitudinal direction. During the oscillating movement of the oscillating body, the webs are preferably bending back and forth. By interconnecting the at least one web to the housing and/or the chassis, the swing bridge is preferably secured so that a movement of the swing bridge is only permitted by one degree of freedom, i.e. a linear longitudinal oscillation. If the swing bridge is secured by hot-staking, the free ends of the webs may be pressed into press ribs, whereupon those ribs are melted by hot staking.

Further, a central axis of the electric motor may be arranged offset to the second axis. Preferably, the drive shaft of the electric motor runs along the central axis of the electric motor. Additionally or alternatively, it may be preferred if the central axis of the electric motor also forms the first axis.

In one embodiment, the electrically driven device may comprise a cap, wherein the cap is removably coupled to the housing, and wherein the put on cap is at least covering a button to actuate the electrically driven device. During the use of the electrically driven device the cap may be removed, while the cap may be attached to the electrically driven device doing storage and/or transportation. Thus, during storage and/or transportation the use of a cap can prevent an undesired activation of the device and/or an unwanted dirtying, for example an unwanted dirtying of a dopp kit by cut-off hair. Further, the cap may protect the electrically driven device against any ingress, for example dust ingress, and, therefore, may extend the durability of the electrically driven device.

The electrically driven device may further comprise at least one cutter unit, wherein the drive shaft may be mechanically coupled to the at least one cutter unit. The at least one cutter unit may comprise at least a slit cutter, wherein the slit cutter comprises at least an outer blade, preferably a foil-type blade, and an inner blade. Preferably, an oscillation of the inner blade is caused by the oscillation of the drive shaft of the oscillating body.

Furthermore, the electric motor may be sealed against undesirable environmental influences, such as moisture penetration, by at least one of the housing and/or the chassis and/or the cap. This is especially required when the electrically driven device is used within a wet environment such as a bathroom. The sealing of the electrically driven device and/or the moisture-sensitive components is effected by common means.

The invention will subsequently be explained in detail with reference to specific embodiments shown in the Figures. All features described and/or shown in the Figures are subject matter of the invention, irrespective of the grouping of the features in the claims and/or their back references.

BRIEF DESCRIPTION OF THE DRAWINGS

FIG. 1c shows a top view of the swing bridge of FIG. 1a;

FIG. 1d shows a side view of the swing bridge of FIG. 1a;

FIG. 4b shows a sectional view of the electrically driven device of FIG. 4a.

Figure 1A:
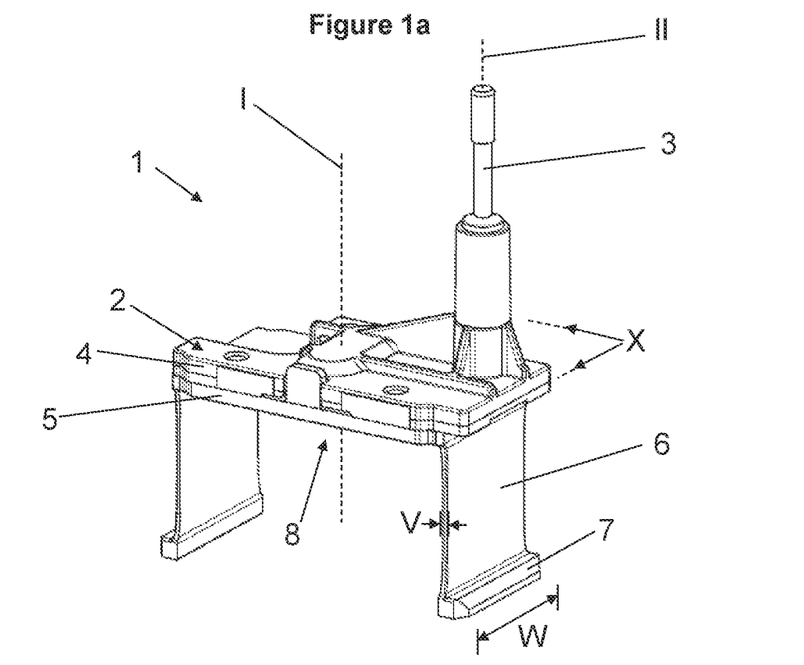
FIG. 1a shows a perspective view of a swing bridge according to an embodiment of the invention.

The swing bridge 1 shown in FIG. 1a comprises an oscillating body 2 and a drive shaft 3. The oscillating body 2 of FIG. 1a has an upper first component 4 and a lower second component 5, wherein the first component 4 comprises a different shape than the second component 5. The oscillating body 2 and the respective first and second component 4 and 5 are ultrasonic welded together and define plane X.

The swing bridge 1 further comprises two webs 6 being an integral part of the second component 5 of the oscillating body 2. The two webs 6 each have a free end 7 facing away from the oscillating body 2. To be bendable in a longitudinal direction, the webs 6 comprise in general a smaller material strength V compared to their width W. The width W of the webs 6 in the transverse direction shown in FIG. 1*a* is a bit smaller than the width of the components 4 and 5 of the oscillating body 2. Additionally, the width W of the webs 6 between the oscillating body 2 and the free end 7 can differ. Further, the free ends 7 of FIG. 1*a* have protrusions facing away from the oscillating body 2 for securing the swing bridge 1.

Furthermore, the second component 5 of the swing bridge 1 has a slot 8 (shown in FIG. 2) with a first axis I, which runs through the center of the slot 8. The drive shaft 3 is overmolded within a corner section of the first component 4 and runs along a second axis II. The two axes I and II are offset in two directions of the plane, i.e. a longitudinal and a transverse direction.

Figure 1B:
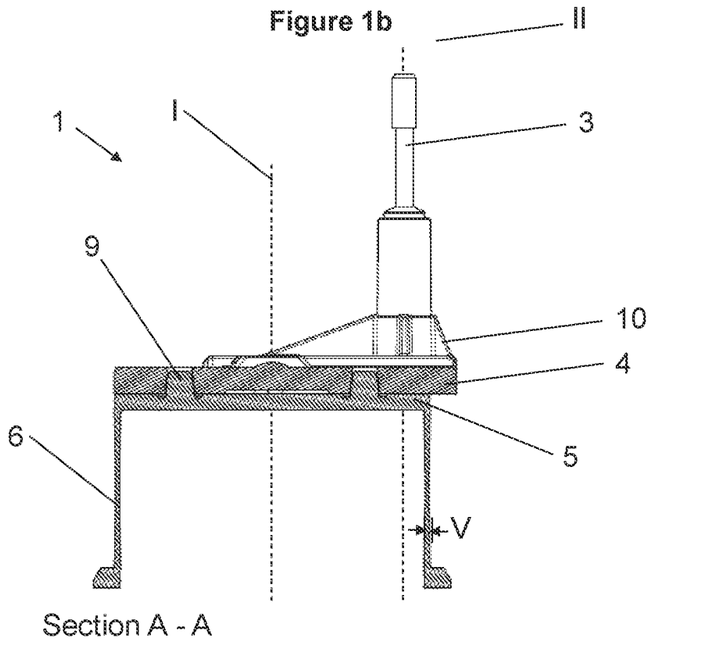
FIG. 1b shows a sectional view of the swing bridge of FIG. 1a along line A-A in FIG. 1c.
Figure 1C:
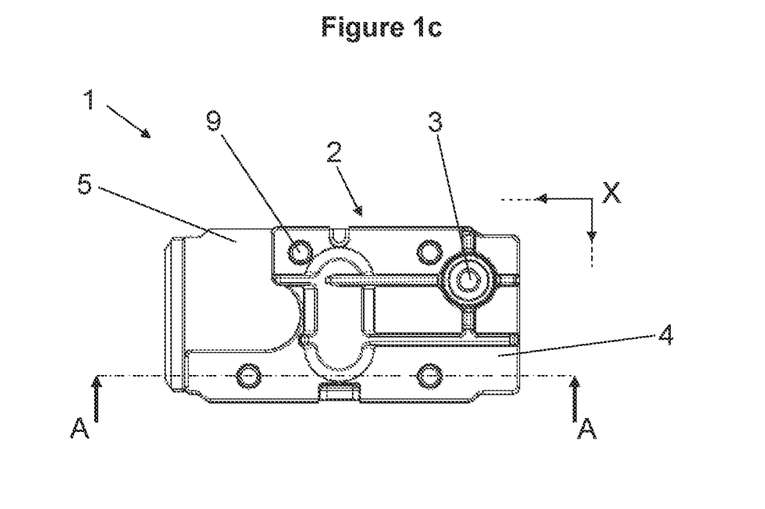

The section A-A of FIG. 1*b* is shown in FIG. 1*c*. Welding dots 9 in FIG. 1*b* are used for ultrasonic welding of the two components 4 and 5 of the oscillating body 2. The first component 4 comprising the drive shaft 3 protrudes beyond the second component 5 in the longitudinal direction on the side where the drive shaft 3 is located. Moreover, the overmolding of the drive shaft 3 comprises ribs 10 for support on the first component 4.

FIG. 1*c* shows a top view of the swing bridge 1. It can be noticed that the first component 4 and the second component 5 are ultrasonic welded by four welding dots 9. Even though it seems that the swing bridge 1 only comprises one web 1 on the left side, the web on the right side is simply covered by the protruding first component 4 as mentioned before. Further, the drive shaft 3, which is located in a corner section of the oscillating body, is offset in two directions of the plane, wherein the offset in the longitudinal direction is bigger than the offset in the transverse direction of plane X.

Figure 1D:
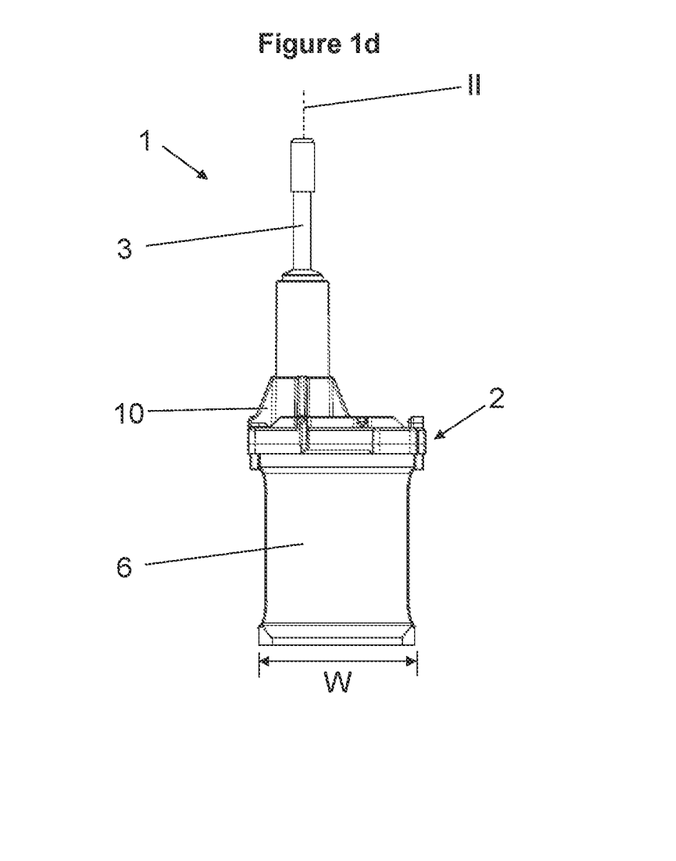

In FIG. 1*d* a side view of the swing bridge 1 is shown, wherein the above-mentioned differing width W of the webs 6 can be noticed. The width W of web 6 is bigger at the free end 7 comprising the protrusion for securing the swing bridge 1.

Figure 2:
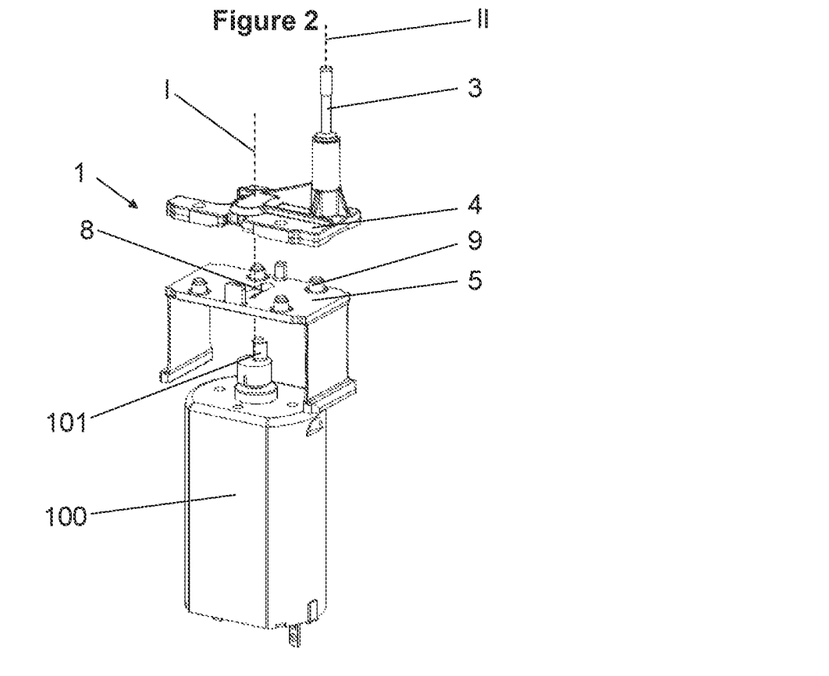
FIG. 2 shows an exploded view of the components of the swing bridge of FIG. 1a together with an electric motor.

FIG. 2 shows an exploded view of the swing bridge 1 of FIGS. 1*a* to 1*d* together with an electric motor 100. The second component 5 shows the above-mentioned slot 8. The slot 8 depicted in FIG. 2 is an elongated hole with a smaller widening in the longitudinal direction of the swing bridge 1. The electric motor 100 comprises an eccentrically rotatable drive pin 101. Once the swing bridge 1 and the electric motor 100 are assembled, the drive pin 101 extends into the slot 8 of the swing bridge 1. Thus, a rotatable motion of the drive pin 101 can be converted into an oscillating motion of the swing bridge 1. Especially when the swing bridge 1 is secured by the free ends 7 of the webs 6, this oscillating motion is a linear oscillating motion in the longitudinal direction of the swing bridge 1 (neglecting the deflection in the direction perpendicular to plane X). The drive pin 101 may be coupled to a drive shaft 104 (shown in FIG. 4*b*) of the electric motor 100 or may be an integral part of the drive shaft 104. Further, FIG. 2 depicts the offset between a drive shaft 104 of an electric motor 100 and the drive shaft 3 of the swing bridge 1 and, thus, shows an asymmetric assembly.

Figure 3:
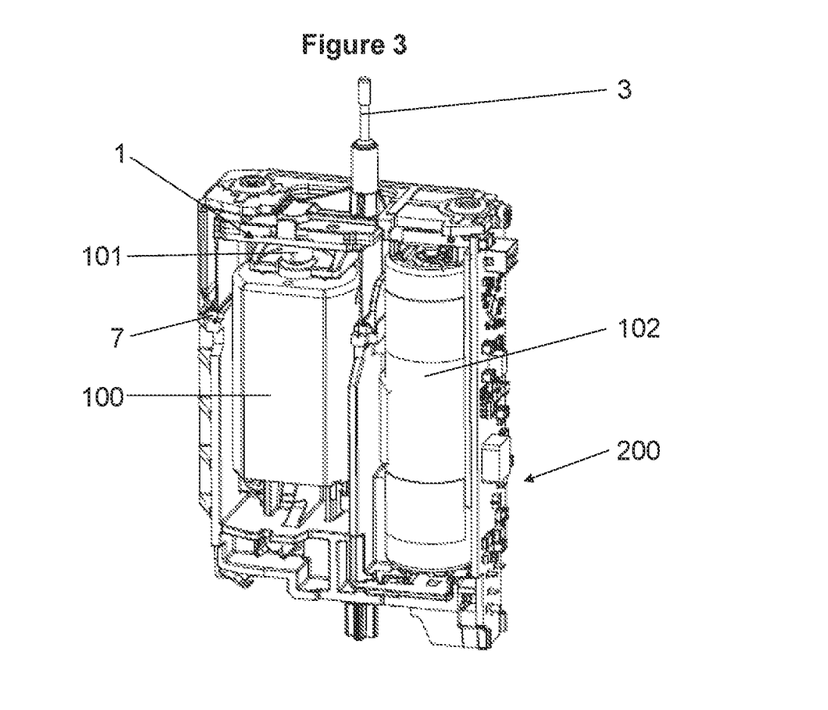
FIG. 3 shows a perspective view of the swing bridge and the electric motor of FIG. 2 arranged within a chassis.

A chassis 200 comprising the assembled swing bridge 1 and electric motor 100 together with a battery unit 102 is shown in FIG. 3. The chassis 200 is half-open. Hence, the rear wall is at least mostly closed. Additionally or as an alternative, the chassis 200 may be coupled to a housing or may be an integral part of a housing. The battery unit 102 is preferably rechargeable. Further, the free ends 7 of the swing bridge 1 are secured to the chassis 200. One way to secure the swing bridge 1 to the chassis 200 is to press the free ends 7 of the webs 6 into press ribs of the chassis 200 and to melt those ribs by hot-staking. Once the swing bridge 1 is secured, only a movement of the oscillating body 2 is permitted. Further, due to the big width W of the webs 6 compared to their material strength V, the webs 6 are stiff in their transverse direction, while being flexible in their longitudinal direction. Thus, a linear oscillating motion of the swing bridge 1 is caused by a rotatable motion of the drive pin 101 extending into the slot 8 of the oscillating body 2.

Figure 4A:
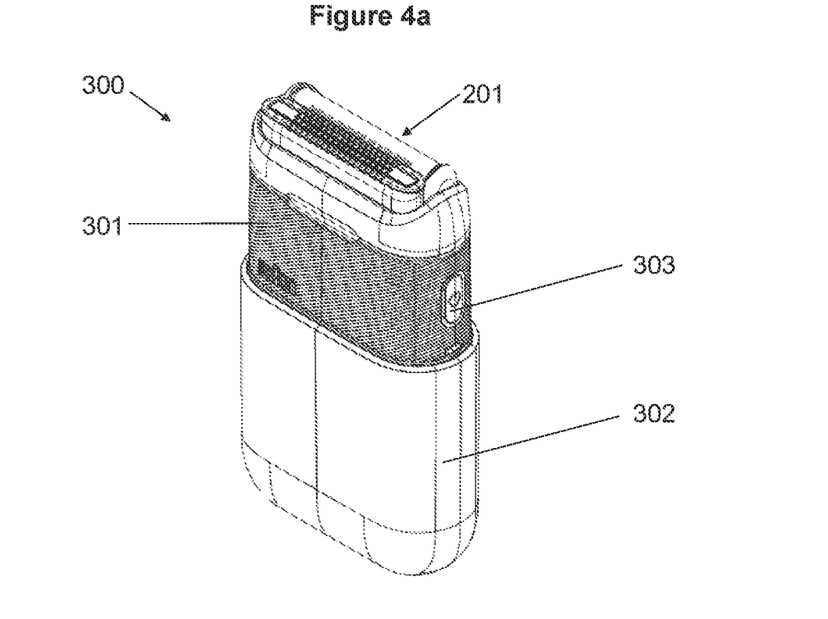
FIG. 4a shows a perspective view of an assembled electrically driven device.

FIG. 4*a* illustrates an electrically driven device 300 comprising the assembled chassis 200 (not shown) of FIG. 3. The electrically driven device 300, here an electric shaver, comprises an upper housing 301, an outer housing 302, a button 303 and a cutter unit 201. The upper housing 301 includes the button 303. The button 303 is used to actuate the electrically driven device 300.

Figure 4B:
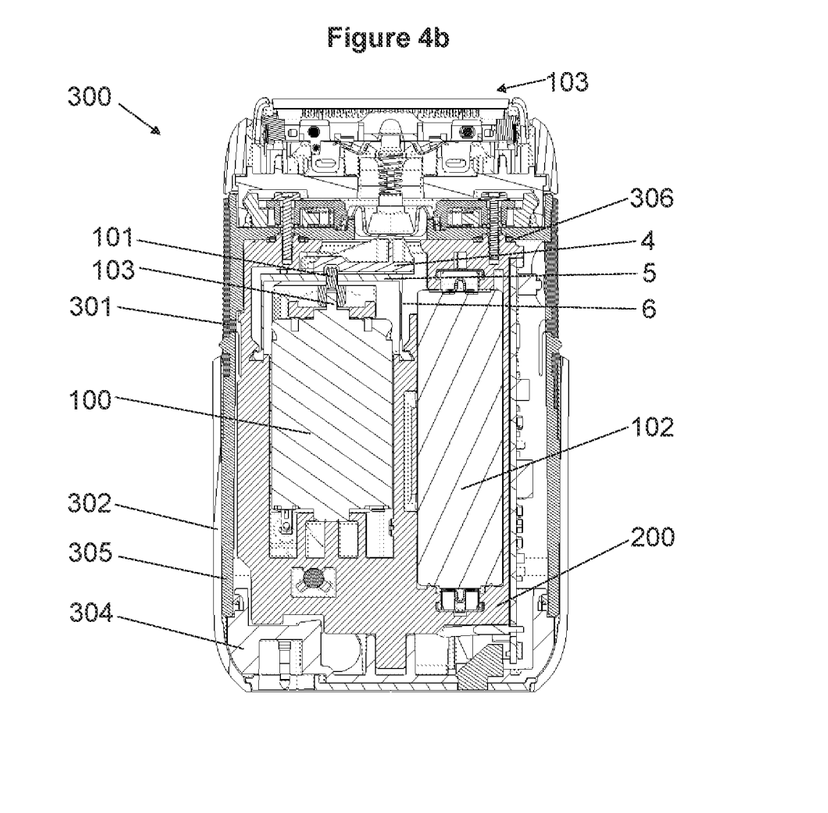

A cross-sectional view of the electrically driven device 300 is shown in FIG. 4*b*. The electric driven device 300 comprises the chassis 200 and the cutter unit 201. The chassis 200 is fixed within the housing and comprises the swing bridge 1, the electric motor 100 and the battery unit 102. The electric motor 1 is arranged on the left side of the electrically driven device 300 and the battery unit 102 is arranged on the right side of the chassis 200 as seen in FIG. 4*b*. Hence, the assembly of the electric motor 100 and the battery unit 102 is asymmetric according to the drive shaft 3 of the swing bridge 1.

The electric motor 100 comprises a drive shaft 104 and an attachable eccentrically rotatable drive pin 101. The drive pin 101 extends into the slot 8 and mechanically couples the electric motor 100 to the swing bridge 1, wherein the swing bridge 1 is secured within an outer and an interior wall of the chassis 200. As can be seen from FIG. 4*b*, the drive pin 101 extends through slot 8 of the second component 5 and protrudes into a recess of the first component 4. Further, drive shaft 3 of the swing bridge 1 is mechanically coupled to the cutter unit 201.

Additionally, the electrically driven device 300 comprises multiple housing parts, i.e. the upper housing 301, the outer housing 302, a lower housing 304 and an inner housing 305. All housing parts 301, 302, 304 and 305 and the chassis 200 are coupled by attachment means such as hooks, screws or the like. Further, the upper housing 301 comprises a softer material than the inner housing 305. In order to prevent the inner component parts of the electrically driven device 300 to be wetted, especially the electric motor 100 and the battery unit 102, the housing parts and/or the chassis are sealed by seals 306.

Figure 5:
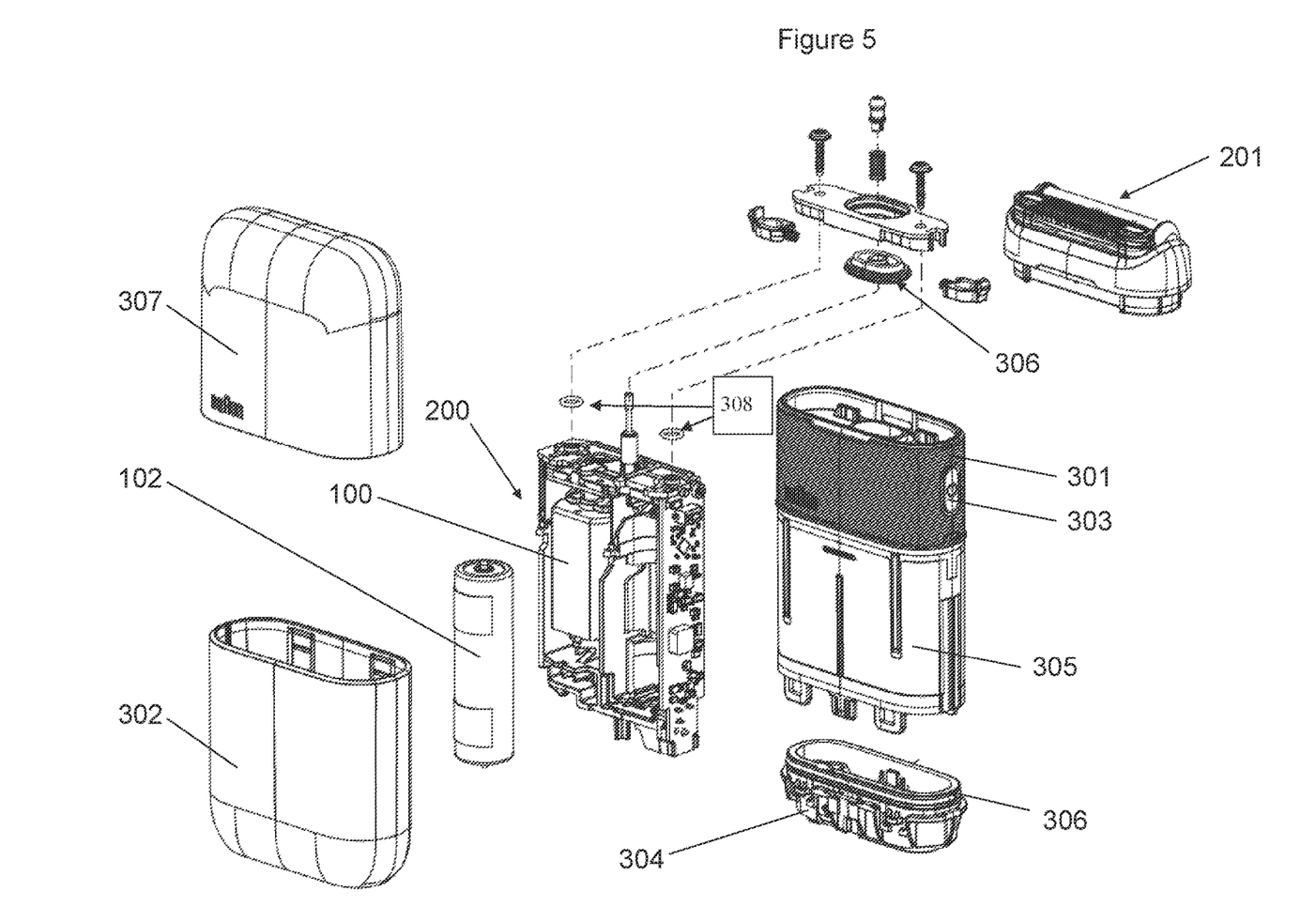
FIG. 5 shows an exploded view of the electrically driven device of FIG. 4a together with a cap.

Additional seals 306 can be seen in an exploded view of the electrically driven device 300 in FIG. 5. Furthermore, FIG. 5 shows a cap 307 that can be attached to the electrically driven device 300 during storage and/or transport. The dotted lines in FIG. 5 demonstrate the way of assembly of some housing components and seals 306 to the chassis 200.

The assembled exemplary electrically driven device 300 with the electric motor 100, the battery unit 102, the swing bridge 1 and the cutter unit 201 is therefore adapted to convert the rotatable motion of the drive shaft 104 of the electric motor 100 into a linear oscillation of the drive shaft 3 and thus to operate the cutter unit 201. Therefore, the swing bridge 1 converts the rotatable motion of the drive shaft 104 of the electric motor 100 and the respective eccentrically drive pin 101 into a linear oscillating motion of the drive shaft 3 and thus the cutter unit 103.

When the electrically driven device 300, i.e. the electric motor 100, is actuated by button 303 and the battery unit 102 powers the electric motor 100, the drive shaft 104 starts rotating. The drive pin 101, which is attached to the drive shaft 104 converts the rotatable motion into an eccentrically rotatable motion. As the drive pin 101 extends into slot 8, i.e. an elongated hole with its smaller widening in the longitudinal direction of the swing bridge 1, a full rotation of the drive pin 101 may first push the swing bridge 1 in the longitudinal direction to its right side, wherein the webs 6 bent and only the oscillating body 2 of the swing bridge 1 is shifted. Since, the drive pin 101 continues to rotate, the drive pin 101 reaches the bigger widening of the elongated hole, followed by a push of the swing bridge 1 in the opposite direction, i.e. to the left side. Between the transition of the movement of the swing bridge from the right to the left, the webs 6 relax before they are bent again. As the rotatable motion of the drive pin 101 continues, the swing bridge 1 and therefore the drive shaft 3 continues to oscillate in its longitudinal direction, which operates the cutter unit 201.

As the swing bridge 1 enables an offset between the drive shafts 3 and 104, the electric motor 100 can be assembled within the electrically driven device 300 in an edge portion, close to the side walls of the chassis and/or the housing. Hence, space for a battery unit 102 on the side opposite to the electric motor 100 is created and the use of the available installation space can be optimized.

Consequently, the use of the inventive swing bridge 1 is particularly suitable for small electrically driven devices.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCE NUMERALS

1 swing bridge
2 oscillating body
3 drive shaft (swing bridge)
4 first component
5 second component
6 web
7 free end
8 slot
9 welding dots
10 ribs
100 electric motor
101 drive pin
102 battery unit
103 drive shaft (electric motor)
200 chassis
201 cutter unit
300 electrically driven device
301 upper housing
302 outer housing
303 button
304 lower housing
305 inner housing
306 seal
307 cap
308 seal/o-rings
I first axis
II second axis
V material strength (web)
W width (web)
X plane

What is claimed is:

1. A swing bridge for converting a rotary motion into a linear oscillating motion, comprising:
   an oscillating body defining a plane, the oscillating body comprising an elongated slot arranged in the plane, wherein a first axis extends through the slot perpendicular to the plane,
   a drive shaft protruding perpendicular to the plane along a second axis, wherein the oscillating body has a center axis and a corner and the drive shaft is located in the corner away from the center axis, and
   at least one web extending at least substantially perpendicular to the plane, the web having a free end facing away from the oscillating body for securing the oscillating body to permit movement of the oscillating body parallel to the plane, wherein the first axis and the second axis are offset at least in one direction of the plane.

2. The swing bridge according to claim 1, wherein the slot is located substantially centrally on the oscillating body.

3. The swing bridge according to claim 1, wherein the first axis and the second axis are offset to each other in two directions of the plane.

4. The swing bridge according to claim 1, wherein the oscillating body comprises at least two components arranged on top of one another, wherein each of the components comprises a planar section, and wherein the planar sections are connected in an integrally bonded manner.

5. The swing bridge according to claim 4, wherein the at least one web is an integral part of one of the at least two components.

6. The swing bridge according to claim 4, wherein the two components comprise a plastic material, and wherein the plastic material is a polyoxymethylene.

7. The swing bridge according to claim 4, wherein one of the at least two components is coupled to the drive shaft, and wherein the drive shaft is overmolded.

8. The swing bridge according to claim 1, wherein the drive shaft comprises a metal material.

9. The swing bridge according to claim 1, wherein the at least one web is coupled to the oscillating body for movement with the oscillating body.

10. The swing bridge according to claim 1, wherein the oscillating body comprises four quadrants and the drive shaft is located in one of the four-quadrants.

11. An electrically driven device comprising a housing with a chassis, an electric motor mounted in the chassis and comprising an eccentrically rotatable drive pin, and the swing bridge according to claim 1, adapted to be mechanically coupled to the drive pin, wherein the drive pin extends into the slot of the swing bridge, wherein the eccentrically rotary motion of the drive pin is converted into a linear oscillating motion of the drive shaft by the swing bridge.

12. The electrically driven device according to claim 11, wherein the second axis forms a central axis of the housing or the chassis.

13. The electrically driven device according to claim 11, wherein the at least one web is interconnected to the housing or the chassis.

14. The electrically driven device according to claim 11, wherein a central axis of the electric motor is arranged offset to the second axis.

15. The electrically driven device according to claim 11, wherein the electrically driven device further comprises a cap, wherein the cap is removably coupled to the housing, and wherein the cap is at least covering a button to actuate the electrically driven device.

16. The electrically driven device according to claim 11, wherein the drive shaft is mechanically coupled to at least one cutter unit.

17. The electric driven device according to claim 15, wherein the electric motor is sealed against undesirable environmental influences by seals of at least one of the housing and the chassis and the cap.

* * * * *